Patented Nov. 3, 1931

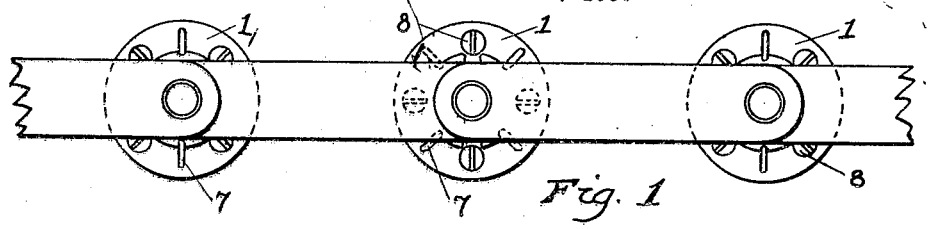
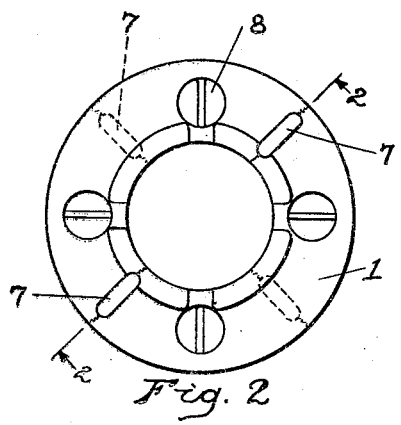
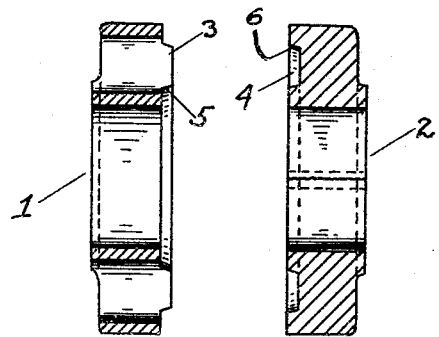
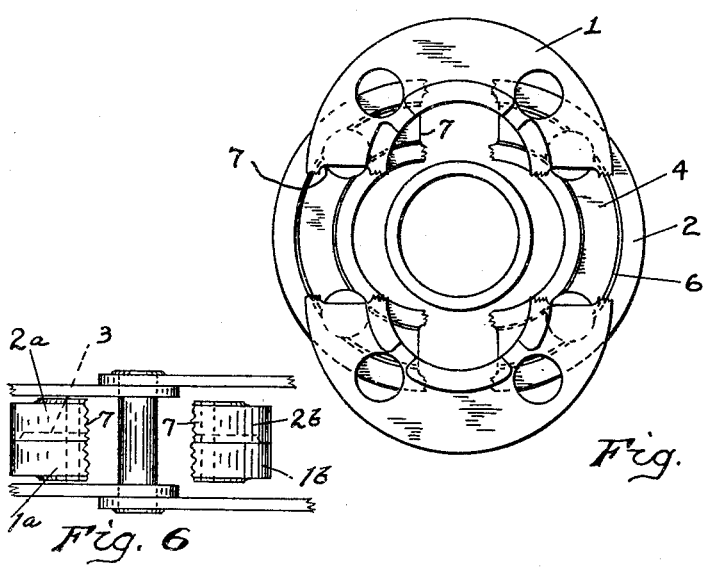
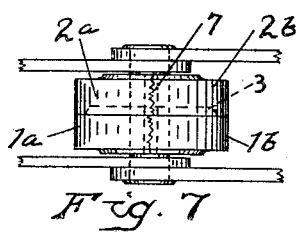
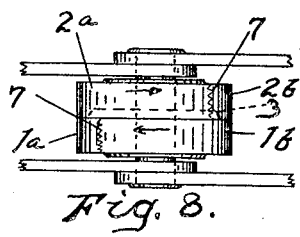

1,829,973

UNITED STATES PATENT OFFICE

HARRY W. WILKINSON, OF PHILADELPHIA, PENNSYLVANIA, ASSIGNOR, BY MESNE ASSIGNMENTS, TO BAKER PERKINS CO. INC., OF SAGINAW, MICHIGAN, A CORPORATION OF NEW YORK

CONVEYER ROLLER

Application filed September 12, 1930. Serial No. 481,468.

This invention relates to conveyer rollers and pertains more particularly to split rollers that may be quickly and easily removed from and replaced on the pintles of chains without disassembling the chain, conveyer or machine of which the conveyer may form a part.

The roller embodied in this invention is particularly adapted for conveyers in which dust has a tendency to enter the clearance between the bore of the roller and the pintle or bushing upon which the roller revolves, and either cut the bore or pintle, or compact in the clearance to prevent the roller from revolving.

This sliding of the roller along the conveyer tracks or supports, when the compacted dust in the clearance above referred to prevents the roller from turning, soon wears a flat spot on the roller which, if the roller is later freed, produces damaging knocks as well as unpleasant noises and which necessitates the removal of the roller for efficient operation of the machine.

One specific illustrative adaption on my invention is to the conveyer of an oven in which bread, cakes, pastry, and the like are baked.

Due to the high temperature of the oven, during the baking periods, the oils used to lubricate the rollers, dry and leave a carbon residue around the pintle which in time prevents the roller from turning. This causes the roller to drag and wear a flat spot which causes loss of power, excessive wear on the tracks or conveyer supports, and undue stresses in the conveyer.

Heretofore when the above conditions arose, it was necessary to disassemble the chain to replace the damaged roller, and as the pintle is generally bushed or riveted to the side lines of the chain, considerable time and effort were required to replace the worn roller.

The conveyer of a baking oven is generally composed of heavy baking plates or trays secured to the chains which travel through the oven.

When it became necessary to disconnect the chain to replace a damaged roller, the weight of the plates and chain pulled the separated links apart so that in reassembling the conveyers, a heavy block and tackle was required to draw the chain links together again. This operation required several men to handle the heavy tackle and conveyer and took several hours to replace a single roller. Besides requiring heavy tackle, the work had to be done over the week-end, or at a period when the oven heat was shut off.

The objects of my invention are to provide a roller which may be easily removed and replaced without disassembling the chain or the machine of which the chain may form a part and which may be replaced in a few minutes during a short break during the baking period.

Further objects of my invention are to provide a split roller which may be quickly and cheaply machined, to provide means for holding the joined parts in alignment, and to assure perfect continuity of contour of rim and bore during the machining operation and after assembly on the chain.

With these and certain other objects in view, which will appear later in the specification my invention comprises the device described and claimed and the equivalents thereof.

In the drawings, Fig. 1 is a side elevation of a short section of a roller chain having the rollers constructed according to the present invention. The two end rollers being assembled on the pintles as they would be when the chain was first assembled. The middle roller being assembled as it would be for replacement.

Fig. 2 is a side elevation of a roller in "replacement assembled relation".

Figs. 3 and 4 are cross sections on the line 2—2 of Fig. 2, Fig. 3 being the male disc and Fig. 4 the female disc.

Fig. 5 is a view showing the sections of the roller distended to show their relative positions when reassembled.

Figs. 6, 7, and 8 show diagrammatically how the rollers are assembled around the pintle of the chain without removing the side links.

As shown in the drawings the roller consists of a male and female disc or section (1 and 2), the male disc 1 having, preferably, a continuous tongue 3 adapted to fit in a groove 4 in the female disc 2. The side walls of the tongue 3 and groove 4 being tapered as at 5 and 6, the purpose of which will be explained later.

While I have shown a continuous tongue and groove, which is a simple lathe operation to make, dowel pins, or short projections adapted to fit into a corresponding groove could be used without departing from the spirit of my invention.

To assure easy removal when damaged and easy replacement, I provide radial slots 7 through each disc to weaken the same so that each disc or section may be easily broken radially through the axis, thus dividing the disc or section into two segments which may be easily removed from or assembled around the pintle of the chain without removing the pintle from the side links.

Each slot 7 extends from a point adjacent the bore to a point adjacent the rim thereby leaving a thin portion of metal in a continuous band adjacent the bore and rim of the roller, thus the disc may be machined in one piece assuring a saving of time and perfect continuity of contour of both rim and bore.

When a chain, using my improved rollers, is first assembled, the two sections of the roller are secured together by bolts 8 with the slots 7 adjacent each other so that they extend straight through the roller as shown in the two end rollers of Fig. 1.

When it becomes necessary to remove the roller, the end of a cold chisel is inserted in the slot and a light blow with a hammer on the chisel will break the roller into two segments which may then be easily removed from the pintle of the chain.

To replace a new roller on the assembled chain the fastening bolts 8 are removed and each disc 1 and 2 is broken radially through the cored slots 7 and the pieces removed from the chain. To assemble the roller around the pintle of the chain, a segment of the male section as 1a and a section of the female section as 2a are placed together with the tongue 3 in groove 4 and the other segments as 1b and 2b are placed together in a like manner and the two assembled segments 1a, 2a, and 1b, 2b are placed between the side links of the chain as shown in Fig. 6. The assembled segments are then brought together around the pintle as shown in Fig. 7 and the reassembled sections 1a, 1b and 2a, 2b are rotated one quarter turn as shown in Fig. 8 and bolted together with the slots 7 at right angles to each other as shown by the center roller of Fig. 1.

While I have described a conveyer as originally assembled with my present roller, yet it is obvious that this invention may be used to replace solid rollers which are broken apart from the pintle in the usual manner by the use of a cold chisel, cutting torch or saw.

When the discs are broken into segments the break at the ends of the slot is generally ragged which is advantageous in reassembling, as the ragged parts of one segment fit tightly in the corresponding part of the other segment, and there is little danger of the joints slipping when strains are put on the roller.

By constructing the tongue 3 and groove 4 with tapered side walls 5 and 6, the segments are drawn tightly together when the bolts 8 are tightened thus perfect continuity of contour of rim and bore is maintained after assembly, slippage of the joints is prevented and shearing strains on the bolts are relieved, the strains being taken up by the tongue and groove which, by their heavy construction, are better enabled to withstand these strains.

By the quartering arrangement of the segments in assembling, the segment of each disc forms a butt strap or lap joint over the joint of the other disc and thus the segments are firmly locked together.

By the above means I have produced a conveyer roller that may be quickly and easily removed and replaced in a few minutes and without the use of heavy tackle, that may be quickly and easily machined and which may be hardened to withstand severe wear without fear of distortion of the rim due to shrinkage during the hardening process.

Having thus described my invention, what I claim and desire to secure by Letters Patent is:

1. A roller for chain conveyers comprising two sections placed face to face, a tongue on the face of one section and a groove on the face of the other section, said tongue and groove adapted to register with each other when in assembled relation, radial slots in each section adapted to weaken the same whereby the section may be easily broken into segments and means for fastening the sections and segments together for the purposes set forth.

2. A roller for conveyers comprising two sections placed face to face, a continuous groove in the face of one section, projections on the face of the other section, adapted to engage the continuous groove in the first mentioned section to permit the sections to be rotated when assembling and maintain continuity of contour of rim and bore, weakening means in each section so that the sections may be easily broken into segments and means for fastening the sections and segments together for the purposes set forth.

3. A roller for conveyers comprising two sections placed face to face, grooves in the face of one section, projections on the face of the other section adapted to engage the grooves of the first mentioned section to permit the sections to be rotated when assembling and maintain continuity of contour of rim and bore, weakening means in each section so that the sections may be easily broken into segments and means for fastening the sections and segments together for the purposes set forth.

In testimony whereof I affix my signature.

HARRY W. WILKINSON.